US011392424B2

(12) United States Patent
Calegari et al.

(10) Patent No.: US 11,392,424 B2
(45) Date of Patent: Jul. 19, 2022

(54) METHOD AND DEVICE FOR AIDING DECISION-MAKING FOR THE ALLOCATION OF COMPUTING MEANS ON A HIGH PERFORMANCE COMPUTING INFRASTRUCTURE

(71) Applicant: BULL SAS, Les Clayes-sous-Bois (FR)

(72) Inventors: Patrice Calegari, Les Clayes-sous-Bois (FR); Sébastien Lacour, Les Clayes-sous-Bois (FR); Marc Levrier, Les Clayes-sous-Bois (FR)

(73) Assignee: BULL SAS, Les Clayes-sous-Bois (FR)

( * ) Notice: Subject to any disclaimer, the term of this patent is extended or adjusted under 35 U.S.C. 154(b) by 236 days.

(21) Appl. No.: 16/731,179

(22) Filed: Dec. 31, 2019

(65) Prior Publication Data

US 2020/0210245 A1 Jul. 2, 2020

(30) Foreign Application Priority Data

Dec. 31, 2018 (FR) ...................................... 1874427

(51) Int. Cl.
*G06F 9/50* (2006.01)
*H04L 67/10* (2022.01)

(52) U.S. Cl.
CPC .......... *G06F 9/5077* (2013.01); *G06F 9/5072* (2013.01); *H04L 67/10* (2013.01)

(58) Field of Classification Search
CPC ..... G06F 9/5072; G06F 9/5077; G06Q 10/06; H04L 67/10
See application file for complete search history.

(56) References Cited

U.S. PATENT DOCUMENTS

| 7,640,547 | B2* | 12/2009 | Neiman | ................ G06F 9/5044 |
| | | | | 705/5 |
| 9,055,067 | B1* | 6/2015 | Ward, Jr. | ................ H04L 12/14 |
| 9,560,166 | B2* | 1/2017 | Alam | ...................... H04L 41/22 |
| 2008/0016218 | A1* | 1/2008 | Jones | ..................... G06F 16/954 |
| | | | | 709/226 |
| 2012/0042256 | A1* | 2/2012 | Jamjoom | .............. G06F 9/5011 |
| | | | | 715/736 |

(Continued)

OTHER PUBLICATIONS

Schopf, Jennifer. "A General Architecture for Scheduling on the Grid." Argonne National Laboratory preprint. ANL/MCS-P1000-1002. 17 pages, believed to be dated at least as early as the critical date in this application.

(Continued)

*Primary Examiner* — Jorge A Chu Joy-Davila
(74) *Attorney, Agent, or Firm* — Arc IP Law, PC; Joseph J. Mayo

(57) ABSTRACT

The invention relates to a method for aiding decision-making for the allocation of resources on an HPC-type infrastructure allowing identification of a set of instances that meet a resource requirement. The invention further relates to a computer device (1) comprising a memory module (11) configured to store a resource-class repository, a reservation repository and a keyword repository, a data-processing module (13), a reservation-management module (14), and a communication module (12), said memory module (11) comprising instructions for a program, the execution of which by said data-processing module (13) causes the implementation of the method (100).

8 Claims, 5 Drawing Sheets

(56) References Cited

U.S. PATENT DOCUMENTS

| | | | | |
|---|---|---|---|---|
| 2014/0250440 | A1* | 9/2014 | Carter | G06F 9/5011 |
| | | | | 718/105 |
| 2016/0128083 | A1* | 5/2016 | Shakya | H04W 72/0446 |
| | | | | 455/406 |
| 2018/0084034 | A1* | 3/2018 | Stelmar Netto | H04L 67/1002 |
| 2019/0362571 | A1* | 11/2019 | Jamesapollos | G07C 9/00571 |
| 2020/0142753 | A1* | 5/2020 | Harwood | G06F 9/45558 |

OTHER PUBLICATIONS

Hovestadt, et al. "Scheduling in HPC Resource Management Systems: Queuing vs. Planning." Job Scheduling Strategies for Parallel Processing: 9th International Workshop, JSSPP 2003, Seattle, WA, USA, Jun. 24, 2003. 19 pages.

Hutchison, et al. "Grid Computing—Making the Global Infrastructure a Reality." 2003 John Wiley & Sons, Ltd. ISBN: 0-470-85319-0. 39 pages.

Solomon, Marvin. "The ClassAd Language Manual—Version 2.4." May 2004. 35 pages.

* cited by examiner

| KW | Description |
|---|---|
| RAM | Random access memory |
| GHertz | Processor speed |
| TB | Storage |
| B505 Westmere | Class 1: B505 Westmere graphical node |
| B510 Sandybridge | Class 2: B510 Sandybridge computing node |
| Stockage GPFS | Class 3: GPFS storage node |

FIG. 3A

| Class ID | Freq | RAM | GPU | TB |
|---|---|---|---|---|
| C1 | 2.7 | 64 | - | 0 |
| C2 | 2.4 | 128 | - | 0 |
| C3 | - | 16 | p100 | 0 |
| C4 | - | - | - | 80 |

FIG. 3B

| IDc | ID | C | DT1 | DT2 | DT3 | DT4 | DT5 |
|---|---|---|---|---|---|---|---|
| $ID_{C1}$ | N1 | C1 | DISP | DISP | PRERES | PRERES | PRERES |
| $ID_{C1}$ | N8 | C2 | RES | RES | RES | DISP | DISP |
| $ID_{C1}$ | N41 | C3 | RES | RES | RES | DISP | DISP |
| [empty] | N12 | C4 | DISP | DISP | DISP | DISP | DISP |

FIG. 3C

METHOD AND DEVICE FOR AIDING DECISION-MAKING FOR THE ALLOCATION OF COMPUTING MEANS ON A HIGH PERFORMANCE COMPUTING INFRASTRUCTURE

CROSS-REFERENCE TO RELATED APPLICATIONS

This application claims the benefit of French Patent Application No. 1874427 filed Dec. 31, 2018, the disclosure of which is herein incorporated by reference in its entirety.

The invention relates to the field of high performance computing, and more specifically to the allocation of computing means, which can be used in various applications such as aeronautics, energy, climatology, and life sciences. The invention relates to a method for aiding the allocation of computing means, to a computer program product capable of implementing said method, to a device for aiding the allocation of computing means, and to a high performance computing system integrating such a device.

BACKGROUND ART

High performance computing (HPC) is being developed both for academic research and for industry, in particular in technical fields such as aeronautics, energy, climatology, and life sciences. This computing is generally implemented by clusters. The object of these clusters is to exceed the limits of the existing hardware by sharing resources to allow the parallelized execution of instructions and the aggregation of memory and disk capacity. A cluster is a set of computing means (also referred to as nodes) interconnected by an interconnecting network which can carry out combined operations.

High performance computing (HPC) is being adopted by more and more scientists to help them solve their complex problems. In particular, with an increase between 2017 and 2018 by over 50% of the power of the most powerful computer in the world, the computing power of supercomputers is constantly increasing. In addition, there is a growing number of computing centers (local, regional, national, and international centers) provided with petaflop-class systems.

Beyond the computing power, scientist users want to be able to have portals that make it possible to rapidly provide easier, exclusive access to a set of high performance computing resources that meet their requirements. Therefore, at the same time as the steady increase in the size of the clusters, new HPC-infrastructure multi-location functionalities have come into existence that allow timely, secure and exclusive access to some of these computing means or nodes.

Therefore, the field of HPC is facing both an increase in the size of the infrastructures and the number of computing means as well as an increase in the amount of users wanting exclusive access to a set of computing means that can meet their resource requirements. Nonetheless, all of these end users have in-depth scientific knowledge in their fields, but not necessarily in HPC. Considering the increase in the size of the clusters and the lack of specialization of the users, it is becoming increasingly difficult to rapidly identify and then allocate the computing means that make it possible to meet a given requirement.

There are planners or schedulers that make it possible, within a set of reserved resources, to distribute the computing tasks between the computing means and to schedule them. Nonetheless, these methods and devices only take action once the computing means have been allocated and do not allow an operator to rapidly identify the nodes to be allocated.

In the field of virtualization, there are also methods and devices for allocating storage-space and CPU-power resources. Nonetheless, these methods or devices, which are suitable for the division of resources of a computing means between several users, are not suitable for the allocation of several computing means of an HPC system in which the non-division of the resources and the variety of the computing means involved makes automation of the allocation difficult.

As a result, on the majority of HPC platforms, resource allocation is currently still carried out manually and is becoming increasingly complex with the increase in the number and variety of the aggregated computing means.

Therefore, there is a need for new methods and devices that are capable of aiding operators of HPC IT infrastructures in the planning and allocation of computing means.

Technical Problem

The object of the invention is therefore to overcome the shortcomings of the background art. In particular, the object of the invention is to propose a method for aiding the allocation of computing means that makes it possible to manage the amount and variety of the computing means forming an HPC infrastructure. The method takes into account the the users lack of specialization in IT and the granularity, which is much greater than for virtual machines in which it is portions of computing means that are attributed and not several machines of different categories. Another object of the invention is to propose a device for aiding the allocation of computing means that can be positioned at the interface between the users, the operators and the HPC system without rendering operation more complex in the process.

BRIEF DISCLOSURE OF THE INVENTION

To this end, the invention relates to a method for aiding decision-making for the allocation of computing means on a high performance computing infrastructure allowing identification of a set of instances that meet a resource requirement, said method being implemented by a computer device comprising a communication module, a data-processing module, a reservation-management module and a memory module configured to store a resource-class repository, a reservation repository and a keyword repository, said method comprising the following steps:
  receiving, by means of the communication module, a request message containing data relating to a resource requirement for a given duration;
  identifying, by means of the data-processing module, in the request message:
  a control duration,
  one or more keywords referenced in the keyword repository, and
  one or more control values, each of said control values corresponding to a numerical value associated with a referenced identified keyword;
  computing, from the control values, by means of the data-processing module, one or more required instance values, each corresponding to a numerical value associated with a class of resources referenced in the resource-class repository, said numerical value corresponding to an amount of computing means required to meet the resource requirement; and comparing, from the reservation repository, by means of the reservation-management module, the one or more computed required instance values with available instance values over a duration that is at least equal to the control duration, so as to identify a set of instances per resource class that meets the resource requirement, and an availability period.

Such a method makes it possible to easily manage the resource allocations or reservations on an HPC platform and to share this information within a team of operators in charge of the management and administration of these resources (e.g. administrators, sales representatives or pre-sales resources). In particular, such a method makes it possible to analyze a request message and to compare it with the resource data in order to be able to rapidly identify which resources could meet the requirements of a user and when. Therefore, it is possible to simply determine if, and when, the requested resources are likely to be available. Such a method makes it possible to alleviate the technical difficulties encountered in the management of the resources and capacities in HPC but also to solve the combinatorial problems associated with attributing computing means, to facilitate decision-making, and more generally to ensure good management of the computing environment. This is particularly advantageous for a high performance computing infrastructure which comprises, unlike general infrastructures which work on the assumption of being over-capacity, a limited number of computing resources. Moreover, advantageously, the instances are combined into clusters and are pre-installed with applications using high performance computing. These applications are preferably parallel scientific applications that are ready for use without knowledge of high performance computing.

According to other optional features of the method:

each instance can be associated with a unique identifier, said method may further comprise a step of generating a pre-reservation message including the unique identifiers of the instances identified as meeting the resource requirements. This advantageously makes it possible to identify the particular instances that can meet the received resource requirement.

said method may advantageously comprise a step of generating a graphical representation of the one or more required instance values, which are each associated with a resource class, as a function of time. The generation of such a graphical representation may advantageously provide an operator with a plurality of pieces of information that facilitates decision-making relating to the allocation of instances to a client for a determined duration and for a determined use.

the request message may contain data relating to a time period relating to the resource requirement and in that the identifying step comprises the identification, in the message, of a control time period corresponding to the time period for which the resource requirement is requested. This makes it possible to facilitate the management of information, in particular the allocation of the instances by an operator.

said method may comprise a step of editing, by means of a reservation-management module, the reservation repository following the reception, by means of the communication module, of a reservation confirmation message for the set of suitable instances. This makes it possible to facilitate the management of the reservation repository by systematically updating the data relating to each instance.

the reservation confirmation message may comprise an availability index associated with each of the instances, said availability index assuming a value selected from at least three values, preferably from three values. This makes it possible to improve the management of the information relating to each instance of the reservation-management repository.

the reservation-management module may advantageously be configured to generate an alert when the reservation repository comprises two different availability-index values for the same instance. This advantageously makes it possible to prevent an operator from making any allocation errors in connection with the availability of each instance.

said method may comprise, when the comparing step does not make it possible to identify a set of instances that meets the resource requirement, a step of identifying alternative instances, said step comprising selecting one or more combinations of classes of alternative resources and reservation durations that allow a service to be provided that is equivalent to the resource requirement, then a step of comparing the alternative resource classes and the required alternative instance values thereof with the resource classes of the available instances of the reservation repository. Therefore, if the most suitable instances are not available, the method remains capable of identifying instances that may constitute an alternative solution for meeting the resource requirement.

According to another aspect, the invention relates to a computer device for aiding decision-making for the allocation of computing means on a high performance computing infrastructure, said computer device further comprising a memory module configured to store a resource-class repository, a reservation repository and a keyword repository, a communication module, a data-processing module, a reservation-management module, and:

the communication module being able to be configured to receive a request message containing data relating to a resource requirement for a given duration;

the data-processing module advantageously being configured to identify, in the request message: a control duration, one or more keywords referenced in the keyword repository, and one or more control values, each of said control values corresponding to a numerical value associated with a referenced identified keyword;

the data-processing module advantageously being further configured to compute, from the control values, one or more required instance values, each corresponding to a numerical value associated with a resource class referenced in the resource-class repository, said numerical value corresponding to an amount of computing means required to meet the resource requirement; and the reservation-management module being able to be configured to compare, from the reservation repository, the one or more computed required instance values with available instance values over a duration that is at least equal to the control duration, so as to identify a set of instances per resource class that meets the resource requirement, and an availability period.

A computer device according to the invention makes it possible to facilitate the management of a plurality of computing means (i.e. instances) of different resource classes based on both the resource requirements of a client for a given duration and on the availability of said resources for said duration. Furthermore, such a computer device has the advantage of centralizing the management of the instances in an HPC-type infrastructure and of restoring data to an operator that facilitate decision-making in relation to the management of the allocation of instances within the HPC-type infrastructure. Therefore, owing to a computer device according to the invention, it is possible for an operator to more easily manage the allocation of a plurality of instances of different resource classes over a given period, in particular by optimizing the use of the instances based on the resource requirements and by preventing any allocation errors in connection with said instances.

According to another aspect, the invention relates to a system comprising a high performance computing infrastructure and to a computer device according to the invention, for aiding decision-making for the allocation of computing means on said high performance computing infrastructure.

According to another aspect, the invention further relates to a computer program product comprising one or more instructions that can be interpreted or executed by a data-processing module of a computer device according to the invention, the interpretation or execution of said instructions by said data-processing module causing the implementation of a method according to the invention.

According to another aspect, the invention further relates to a computer-readable tangible storage medium on which a computer program product according to the invention is stored in a non-transitory manner.

Other benefits and features of the invention will become apparent upon reading the following description, given by way of illustrative and non-limiting example, with reference to the accompanying drawings:

FIGS. 3A, 3B and 3C show a keyword repository, a resource-class repository, and a reservation repository, respectively.

Figure 1:
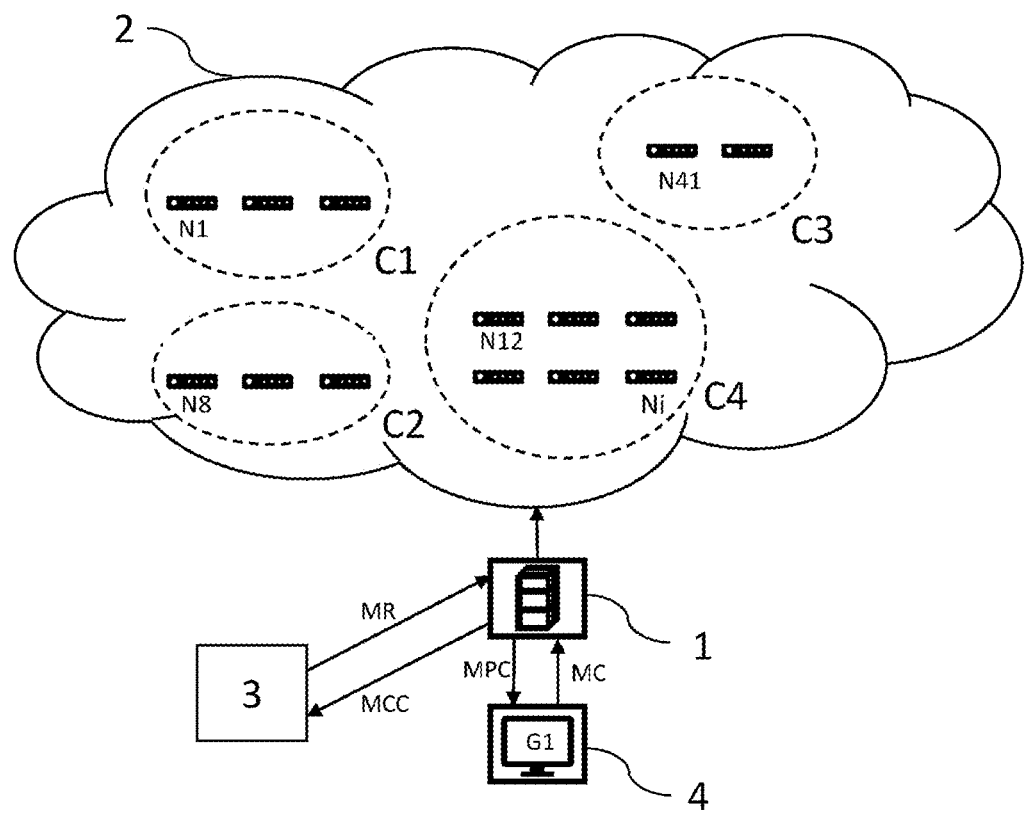
FIG. 1 shows a diagram of a high performance computing system comprising a computer device, a plurality of instances per resource class, and a man-machine interface.

Some aspects of the present invention are disclosed with reference to flow charts and/or to functional diagrams of methods, apparatuses (systems) and computer program products according to embodiments of the invention.

In the drawings, the flow charts and functional diagrams illustrate the architecture, the functionality and the operation of possible implementations of systems, methods and computer program products according to various embodiments of the present invention. In this regard, each block in the flow charts or block diagrams can represent a system, a device, a module or a code, which comprises one or more executable instructions for implementing the specified logic function(s). In certain implementations, the functions associated with the blocks may appear in a different order to that indicated in the drawings. For example, two blocks shown in succession may, in fact, be executed substantially simultaneously, or the blocks may sometimes be executed in the reverse order, based on the functionality involved. Each block in the schematic diagrams and/or the flow chart, and combinations of blocks in the schematic diagrams and/or the flow chart, can be implemented by special hardware systems that execute the functions or specified actions or carry out combinations of special hardware and computing instructions

DESCRIPTION OF THE INVENTION

In the remainder of the description, high performance computing infrastructure or HPC-type infrastructure (HPC standing for high performance computing) means a set of computing resources (i.e. hardware resources and software resources) that allow for the execution of computing tasks or the storage of digital data. These resources comprise, for example and in a non-limiting manner: rapid computing electronic components (e.g. multi-core processors or graphics cards dedicated to the latest generation of scientific computing), random access memory, and mass storage equipment (or secondary memories), in particular hard drives in large quantities. From a functional point of view, an HPC is a machine which aggregates the above equipment/resources to form a computing cluster. Within the meaning of the invention, the high performance computing infrastructure may also comprise computing means that make possible artificial intelligence processes such as deep learning processes, or quantum computing means. All of this equipment is generally associated with an operating system (OS). The operating system is e.g. Windows (registered trademark), or more often UNIX (registered trademark) or one of its variants, such as Linux (registered trademark). Software being executed on this OS can ensure the global management of the hardware resources by taking advantage of their potential in terms of performance, in particular by utilizing the parallelism and by rendering the distribution of the resources transparent.

Within the meaning of the invention, computer device means any device capable of operating one or more processes. From a structural point of view, a computer device may comprise a computing means such as a processor, a storage means, a circuit board, and communication buses configured to allow communication between components of the computer device.

Within the meaning of the invention, instance or computing means means any computer device capable of operating one or more processes, such as a computing node of a high performance computer, a graphical node allowing visual rendering to an operator through a man-machine interface, or a storage node. From a structural point of view, an instance may correspond to a blade (i.e. a circuit board). By way of non-limiting example, all of the instances or the majority of the instances may be computing blades or data storage media. Data storage media comprise data storage disks forming a physical storage system, on which a file system (FS), such as a general parallel file system (GPFS), is mounted, which allows for the distributed storage of files on a large number of physical media, which may exceed one thousand.

Availability of an instance means any instance N1, Ni that is not allocated, i.e. having a reservation repository in a field R of the data structure, an availability index reflecting the status of an instance N1, Ni.

Resource class means one or more instances N1, Ni of a given type, such as, by way of non-limiting example, of the graphical, computing, or storage type.

Repository means a set of static data described in a data memory of a computer device. Said data may optionally be structured in the form of a reference table, a matrix, or a database. The repositories are arranged to be read and/or write accessible, based on the rights of the users, in particular for updating the data in connection with each repository.

Within the meaning of the invention, the expression control duration corresponds to the duration (in time units) during which the resources will be required and will therefore be monopolized by a user.

Within the meaning of the invention, the expression control period corresponds to a time interval, preferably but not limited to being expressed in the format start day/month/year-end day/month/year, during which the resources can be monopolized for the required control duration. For example, a control period corresponds to the temporal scope afforded to the user for accessing these resources. Therefore, resources available outside of this control period would not be useful to said user. The control period corresponds to a duration greater than or equal to the control duration.

Within the meaning of the invention, the expression control period corresponds to a time interval, preferably but not limited to being expressed in the format start day/month/year-end day/month/year, during which the adequate resources (in terms of quantity and quality) are available. Therefore, the availability period corresponds to a duration greater than or equal to the control duration.

Process, compute, determine, display, identify, and compare mean any operation that can be executed by a device or processor, unless the context indicates otherwise. In this regard, the operations relate to actions and/or processes of a data-processing module, e.g. of a computing system or an electronic computer device, or of a computer device, such as a remote server, which manipulates and transforms the data represented as physical (electronic) quantities in the memories of the computing system or other storage devices, transmission devices or information-display devices. These operations may be based on applications or software.

The terms or expressions application, software, program code and executable code mean any expression, code or notation of a set of instructions intended to cause data processing to perform a particular function directly or indirectly (e.g. after a conversion operation into another code). The examples of program code may include, but are not limited to, a sub-program, a function, an executable application, a source code, an object code, a library and/or any other sequence of instructions intended for execution on a computing system.

Within the meaning of the invention, processor means at least one hardware circuit configured to execute operations according to instructions contained in a code. The hardware circuit may be an integrated circuit. Some examples of a processor include, but are not limited to, a central processing unit, a graphics processor, an application-specific integrated circuit (ASIC), and a programmable logic circuit.

Within the meaning of the invention, coupled means directly or indirectly connected to one or more intermediate elements. Two elements may be coupled mechanically, electrically or linked by a communication channel.

Within the meaning of the invention, the expression man-machine interface corresponds to any element that allows a human being to communicate with a computer; in particular, and without this list being exhaustive, a keyboard, and means making it possible, in response to the orders entered on the keyboard, to effect displays and optionally to select elements displayed on the screen using the mouse or a touchpad. Another exemplary embodiment is a touch-screen that makes it possible to select, directly on the screen, the elements touched by the finger or an object, and optionally with the possibility of displaying a virtual keyboard.

In the remainder of the description, the same reference signs are used to designate the same elements.

The computing power of high performance computers is constantly increasing, and this increase is accompanied by the appearance of a growing number of computing centers provided with petaflop-class systems, which are increasingly being used in university and industrial settings every day in numerous technical fields such as aeronautics, energy, climatology, and life sciences. Therefore, the democratization of such computers is accompanied by the need to facilitate access to these high performance computers through portals that make it possible to rapidly provide easier, exclusive access to a set of high performance computing resources based on the requested requirements. However, it has become increasingly difficult to rapidly identify the needs of a user on one hand and then to identify and allocate the computing means making it possible to meet said needs on the other hand. In addition, together with the allocation problems mentioned previously, the number and variety of resources available over time is a real technical challenge for the management and allocation of the resources by an operator.

Therefore, the inventors have developed a new method for aiding decision-making for the allocation of computing means on a high performance computing infrastructure that can be implemented by a computer device, within a high performance computing system comprising a plurality of instances that can be organized by resource class, and a man-machine interface.

FIG. 1 schematically shows a high performance computing system according to the invention. The invention thus relates to any high performance computing system comprising a plurality of instances N1, Ni constituting a high performance computing infrastructure 2 and a computer device 1 for aiding decision-making for the allocation of computing means on said high performance computing infrastructure 2 according to the invention.

More particularly, the high performance computing system may comprise various computer devices configured to communicate with the device 1 according to the invention. Such computer devices may host clients that communicate with the device 1 according to the invention and the high performance computing infrastructure 2. The system according to the invention may e.g. comprise a computer device 3 available to a user and comprising a client configured to interface with the device 1 so as to reserve computing means N1, Ni and to interface with the high performance computing infrastructure 2 so as to submit computing tasks thereto. The system according to the invention may also comprise a computer device 4 available to an operator and comprising a client configured to interface with the device 1 so as to reserve computing means N1, Ni and to display a graphical representation G1 of the set of said instances N1, Ni that meet a resource requirement.

According to another aspect, the invention relates to a computer device 1 for aiding decision-making for the allocation of computing means on an HPC-type infrastructure. An example of a computer device 1 according to the invention is in particular disclosed in connection with FIG. 2. As mentioned previously, a computer device 1 according to the invention may consist in a server. More particularly, the computer device 1 comprises a memory module 11, a communication module 12, a data-processing module 13, and a reservation-management module 14. The different modules or repositories are discrete in FIG. 2, but the invention may provide various types of arrangement, such as a single module combining the set of functions disclosed here. Likewise, these means may be divided across a plurality of electronic cards or grouped together on one single electronic card.

A computer device 1 according to the invention may advantageously comprise a memory module 11 configured to store a plurality of repositories facilitating the management and allocation of the resources. Such repositories are advantageously configurable, i.e. they can be write accessible, e.g. to add, delete and/or edit data specific to a given repository, by an operator e.g. through a man-machine interface 15.

Advantageously, but in a non-limiting manner, a first repository may consist in a keyword repository. Indeed, so that the device 1 according to the invention is capable of identifying and extracting information relevant to the resource requirement of a user, the device may comprise a repository containing a plurality of keywords. Preferably, each keyword may consist in an alphanumerical value, such as a single word or expression, describing a hardware or software feature of a computer device, and more particularly of an instance N1, Ni. Therefore, the keyword repository, as shown in connection with FIG. 3A, may advantageously comprise a first field KW containing an alphanumerical value constituting a keyword, such as the keywords: GB, GHz, TB; associated with the random access memory, the processor speed or the hard drive storage capacity, respectively, the description of which can be specified more precisely in a second Description field. Additionally, the keyword repository can make it possible to create sets of keywords relating to the same object.

In a particular but non-limiting embodiment, a keyword repository may contain one or more alphanumerical values associated with a resource class C1, C2, C3, C4, such as the keywords B505 Westmere, B510 Sandybridge, and GPFS storage, which are associated with class 1: B505 Westmere graphical node, class 2: B510 Sandybridge computing node, and class 3: GPFS storage node, respectively.

In an advantageous but non-limiting manner, a second repository may consist in a resource-class repository. The resources in an HPC infrastructure may advantageously consist in a plurality of instances, as defined previously, of various hardware and software elements. Such a repository makes it possible to facilitate the management of the resources available within an HPC infrastructure. By way of example, an instance may consist in:
- a graphical node, of the type B505 Westmere, 2.67 gigahertz with 24 gigabytes of random access memory, a 128-gigabyte local solid-state drive (SSD) and two nVidia M2070-Q cards;
- a computing node, of the type B510 SandyBridge, 2.60 gigahertz with 64 gigabytes of random access memory, and a 256-gigabyte local solid-state drive (SSD);
- a storage node, of the type high performance general parallel file system (GPFS) storage system attached to a VNX5500 EMC disk array.

The resources in an HPC infrastructure may thus comprise several hundred instances. To facilitate the management and allocation of such instances, in particular based on the needs of a user, the instances can be grouped by resource class C1, C2, C3, C4. Therefore, as shown in FIG. 3B, the resource-class repository advantageously comprises a plurality of resource classes identified by a unique class ID identifier and characterized by associated numerical values of the resource descriptives, said resource descriptives preferably being selected from the keywords in the keyword repository.

As shown in FIG. 3B, it can be seen that, according to the HPC architecture in question, two classes C1, C2 may correspond to various instances of the computing type, it being possible for the instances N1, Ni in said two classes to differ in particular on account of hardware features, such as the processor and/or the random access memory. Likewise, a class C3 may correspond to a visualization node while a class C4 may correspond to a storage node.

The grouping of instances into resource classes C1, C2, C3, C4 additionally makes it possible to factor the description of a large number of identical computing means, more particularly of instances N1, Ni having identical hardware and/or software features, and in fine facilitates the management of said resources by an operator. Each instance N1, Ni may advantageously belong to a single resource class C1, C2, C3, C4.

Preferably but in a non-limiting manner, fields of the resource-class repository may be associated with a numerical value. By way of example, such a numerical value may be associated with the speed of a processor, or with the memory capacity of a hard drive, or more generally any hardware and/or software feature of an instance N1, Ni, and more broadly of a resource class. Therefore, a graphical node, of the type B505 Westmere, 2.67 gigahertz with 24 gigabytes of random access memory, a 128-gigabyte local solid-state drive (SSD) and two nVidia M2070-Q cards, may be registered a reservation repository in the following manner: 2.67 GHz, 24 GB, 128 GB, 2 M2070Q.

The memory module 11 may advantageously be configured to store a third repository consisting in a reservation repository. The reservation repository in particular makes it possible to determine which instances are available based on time (e.g. by time periods). Therefore, it comprises in particular an availability index for each instance and by time period. Such an availability index may consist in any alphanumerical value, such as, by way of non-limiting example, the values PRERES, RES and DISP describing a pre-reserved instance, a reserved instance, and an available instance, respectively. By way of example, such a reservation repository, described in connection with FIG. 3C, may advantageously comprise a plurality of fields, in particular:
- a field $ID_C$ describing the identifier of a user;
- a field ID relating to the identification of an instance N1, Ni;
- a field C describing a resource class C1, C2, C3, C4 of an instance N1, Ni;
- one or more fields DT1, DT2, DT3, DT4, DT5 describing the status PRES, RES or DISP of each instance by time interval; the time interval being configurable.

In a particular embodiment, a memory module 11 may advantageously be configured to store a fourth repository consisting in an access repository, in order to facilitate the planning of the allocation of the resources.

Figure 2:
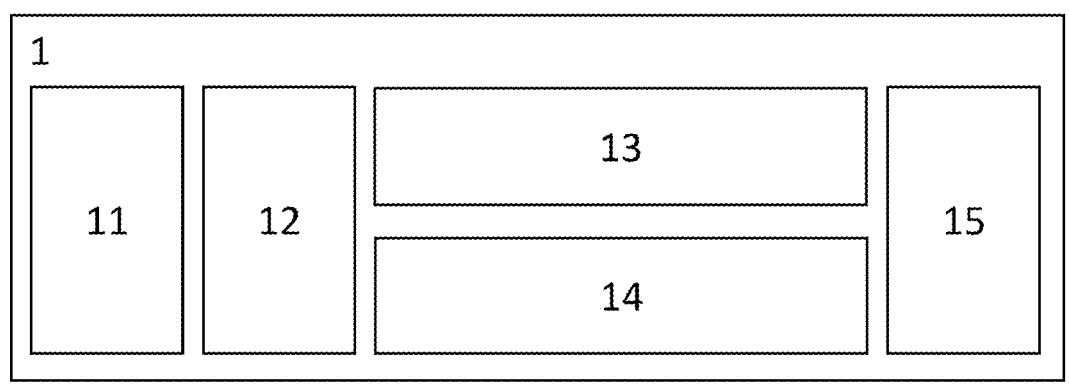
FIG. 2 shows a diagram of a computer device according to the invention.

Like the repositories previously described, such an access repository may comprise several fields, a first field advantageously encoding an identifier of a user and a second field encoding data relating to the description of said user, such as, by way of non-limiting example, a name associated with the identifier of the user or the contact details of the registered office of the establishment to which the resources have been allocated. The access repository may also comprise a field containing a priority index for each user. The priority index being attributed to users so as to be able to manage resource allocation conflicts As shown in FIG. 2, a computer device 1 may comprise a communication module 12. The communication module 12 additionally makes it possible to transmit the data over at least one communication network and may comprise wired or wireless communication. In particular, the communication module 12 e.g. makes it possible to receive and transmit information to remote systems such as tablets, telephones, computers, or servers. These data exchanges may take the form of sending and receiving files.

In particular, the communication module 12 allows communication between the computer device 1 and third-party computer devices such a computer device 3 for use by a user of the high performance computing infrastructure 2 and a computer device 4 for use by an operator of the high performance computing infrastructure 2. Therefore, the communication module 12 is advantageously configured to receive a request message MR. The request message may be transmitted by an email client, a web client (e.g. using an http language) or any other client that allows a user or an operator to send a request message containing data relating to a resource requirement of the HPC. As will be discussed in the following, the communication module 12 may also be configured to transmit a confirmation message MC. The client is generally any hardware and/or software that is likely to access the device 1 according to the invention.

In a particular but non-limiting embodiment, a computer device 1 may also comprise a data-processing module 13, configured to identify one or more pieces of data in the request message MR. Owing to this, it can identify, in a formatted or non-formatted request message, and extract therefrom information required for characterizing a resource requirement.

The data-processing module 13 is thus configured to extract all or some of the data present in the request message MR. It is advantageously configured to identify a control duration D in the request message MR. This control duration D corresponds to the reservation duration that a user deems necessary to meet their resource requirement.

Additionally, the data-processing module 13 is advantageously configured to identify, in the request message MR, one or more keywords corresponding to keywords $KW_1$, $KW_n$ referenced in a keyword repository. The data-processing module 13 is further configured to identify, when a referenced keyword $KW_1, KW_n$ has been identified, one or more control values, each of said control values corresponding to a numerical value associated with a referenced identified keyword $KW_1, KW_n$.

Moreover, the data-processing module 13 may be configured to compute, from the control values and from the data on resource class C1, C2, C3, C4 referenced in the resource-class repository, at least one required instance value $VI_n$ corresponding to a numerical value associated with a referenced resource class and reflecting an amount of computing means required to meet the resource requirement.

The computer device 1 may also comprise a reservation-management module 14, configured to identify a set of instances per resource class that meets the resource requirement. In particular, it may be configured to compare one or more required instance values $VI_n$ with available instance values N1, Ni over a duration that is at least equal to the control duration D. As has been discussed, the available instance values N1, Ni come from the reservation repository.

Such a computer device 1 is advantageously arranged to communicate via a man-machine interface 15, from which a user or operator can interact, such as, by way of non-limiting example, through a wired communication network, or via a wireless network. Therefore, the man-machine interface 50 can be implement a client application, such as a FireFox®, Fennec®, Opera®, Opera Mobile®, Internet Explorer®, Google Chrome® web browser, for example, or an ftp browser such as FileZilla®, which makes it possible to send instructions, e.g. through a confirmation message MC and/or to receive any type of message, more particularly resource-reservation messages, such as, by way of non-limiting example, a reservation pre-confirmation message MPC, a reservation confirmation message MCC, or a request message MR.

According to another aspect, the invention relates to a method 100 for aiding decision-making for the allocation of computing means on a high performance computing infrastructure allowing identification of a set of instances N1, Ni that meet a resource requirement.

Figure 4:
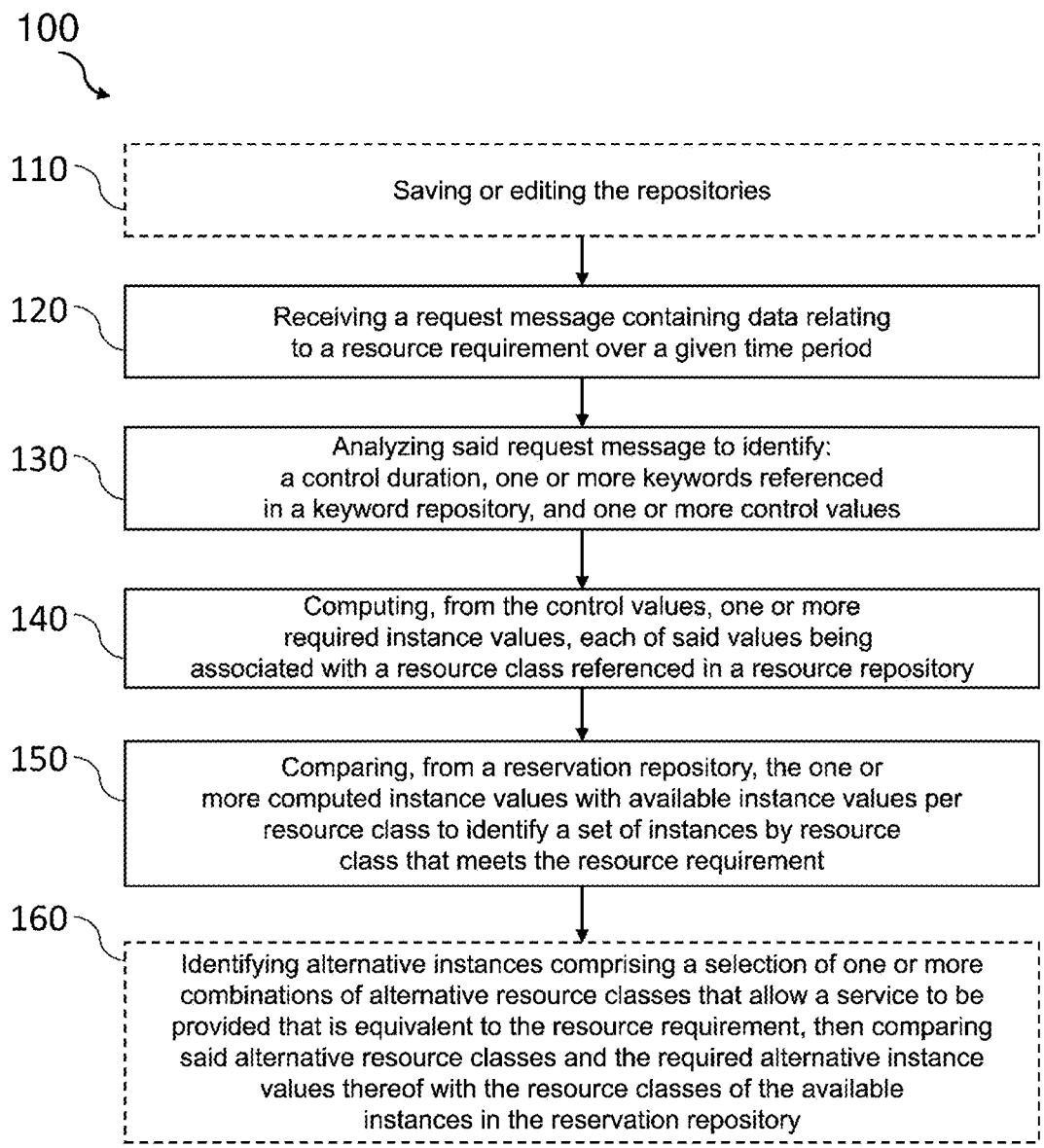
FIG. 4 shows a diagram of a method for aiding decision-making for the allocation of computing means on a high performance computing infrastructure according to the invention. The steps in dashed boxes are optional.

As shown in FIG. 4, a method for aiding decision-making according to the invention comprises an optional step 110 of configuring a resource-class repository, a reservation repository and/or a keyword repository of a computer device 1 according to the invention. This step can be carried out by an operator through a man-machine interface 15.

This configuring step can allow a computer device 1 to adjust said method to the variety of instances N1, Ni and/or resource classes C1, C2, C3, C4 by allowing said repositories to be saved and/or edited directly in the memory module 11 of a computer device 1.

As shown in FIG. 4, such a method comprises a step of receiving 120 a request message MR containing data relating to a resource requirement for a given duration. This step can advantageously be implemented by a communication module 12 as described previously.

Advantageously, a request message MR may be transmitted by a remote third-party entity 3 to the computer device 1, in particular through a web interface dedicated to a computer device 1, or by sending a request message MR in any format that is readable by said computer device 1, such as, by way of non-limiting example, in the http, SSH or FTP format.

As shown in FIG. 4, a method 100 for aiding decision-making for the allocation of computing means on an HPC infrastructure according to the invention allows a request message MR to be analyzed in particular through a step of identifying 130, in said request message MR, a control duration D, one or more keywords $KW_1$, $KW_n$ referenced in a keyword repository, and one or more control values. This identifying step 130 can advantageously be implemented by a data-processing module 13 as described previously.

The control values correspond to a numerical value associated with an identified referenced keyword and they advantageously make it possible to quantify the resource requirement in a formal manner. Therefore, this step makes it possible to obtain a resource requirement formulated in advance through a request message MR. Indeed, the analysis of said request message MR makes it possible to identify the control duration D relating to the requirement. In addition, the identification of keywords $KW_1, KW_n$ referenced in the keyword repository and of a numerical value associated with each of these identified keywords makes it possible to quantify the resource requirement in the form of control values. The identification 130 of the control values may advantageously consist in the implementation of a text analysis algorithm of the parsing type or of any other algorithm that makes it possible to identify a referenced keyword associated with a corresponding numerical value.

A method 100 for aiding decision-making for the allocation of computing means on an HPC infrastructure according to the invention further comprises a step of computing 140 one or more required instance values $VI_n$. This computing step 140 is in particular based on the previously computed control values and on the reservation repository. This step can advantageously be implemented by a data-processing module 13 as described previously.

During this computing step 140, the data-processing module 13 may produce one or more instance values $VI_n$, each of said instance values corresponding to a numerical value associated with a resource class referenced in the resource-class repository. This makes it possible to first of all identify one or more resource classes C1, C2, C3, C4 that meet the resource requirement previously identified in the request message MR. Indeed, as detailed previously, a resource requirement may be of a computational and/or graphical nature, which thus make use of totally different resource classes C1, C2, C3, C4. This makes it possible, in fine, to optimize the resource allocation by an operator, in particular by allowing them to directly identify one or more resource classes C1, C2, C3, C4 that meet a resource requirement as well as the associated instance amounts.

Additionally, this step makes it possible to obtain one or more numerical values corresponding to an amount of computing means required to meet the resource requirement, each of said numerical values being associated with a resource class referenced in the resource-class repository.

A method 100 for aiding decision-making for the allocation of computing means on an HPC infrastructure according to the invention further comprises a comparing step 150 that makes it possible to identify a set of instances per resource class C1, C2, C3, C4 that meets the resource requirement. Additionally, it makes it possible to identify an availability period. This step in particular comprises the comparison of one or more previously computed required instance values $VI_n$ with available instance values, according to the reservation repository, over a duration that is at least equal to the control duration D. This comparing step 150 can advantageously be implemented by a reservation-management module 14 as described previously.

This step advantageously makes it possible to identify, from one or more previously computed required instance values $VI_n$, all the available instances N1, Ni in a given resource class C1, C2, C3, C4 that make it possible to meet a resource requirement over a duration that is at least equal to the control duration D previously identified. Therefore, the method makes it possible to identify a set of instances belonging to a resource class that meets the requirement. It may further generate a plurality of identifiers of instances N1, Ni that make it possible to meet the resource requirement. Therefore, the method makes it possible to determine whether the high performance computing infrastructure is capable of meeting the requirement, and if so, with what resource class and in what amount.

A method 100 for aiding decision-making for the allocation of computing means on an HPC infrastructure according to the invention may also comprise a step of identifying 160 alternative instances. Such a step may result in the identification of a set of instances that do not correspond to the required instance values as identified from the request message MR but consist in instance propositions that make it possible to provide an equivalent solution or to make counter-propositions equivalent to the users initial request and that will allow them to successfully complete the computing project within the time available to them. To do this, this step of identifying 160 alternative instances may e.g. comprise the selection of one or more combinations of alternative resource classes C1, C2, C3, C4 and alternative control durations that allow a service to be provided that is equivalent to the resource requirement.

Indeed, as detailed previously, two resource classes C1, C2 of an HPC-type infrastructure may differ on account of hardware features, such as the processor or the random access memory, defining the computing power of each of said two resource classes. The lack of availability of one of the two resource classes C1 for a given duration does not necessarily mean that none of the potentially available resources can be mobilized to meet the previously identified resource requirement. This makes it possible, in fine, to optimize the resource allocation by an operator, in particular by allowing them to select an alternative resource class C2 to meet a resource requirement. In the case of an alternative solution, the alternative control duration may be different from the identified control duration.

The identifying step is generally followed by a step of comparing the alternative resource classes and their required alternative instance values with the resource classes of the instances available in the reservation repository.

Figure 5:
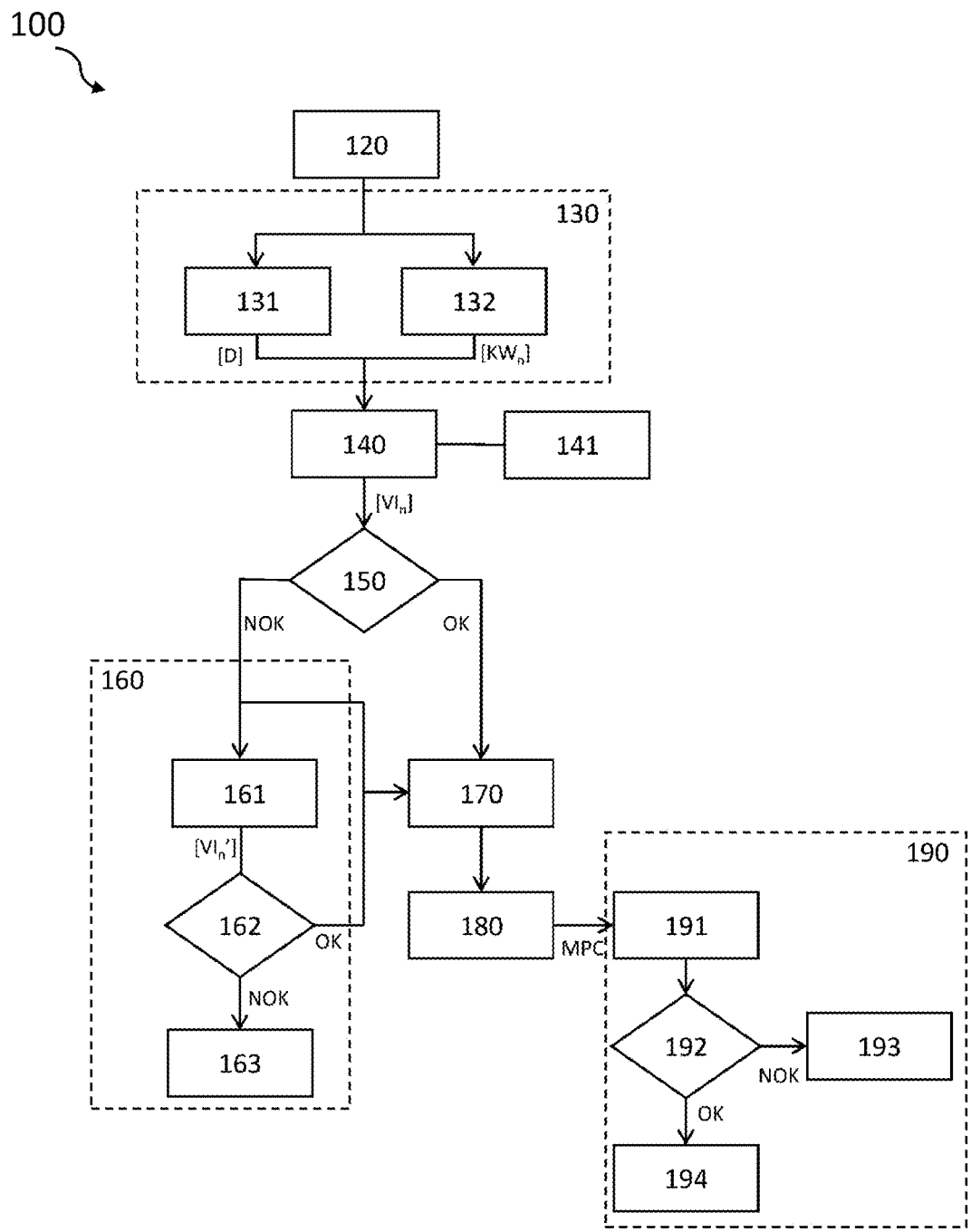
FIG. 5 shows a diagram of an embodiment of a method according to the invention.

FIG. 5 shows a particular embodiment of a method 100 according to the invention, intended to provide an aid to decision-making for the allocation of computing means on an HPC infrastructure to an operator.

Therefore, a method 100 according to the invention comprises a step 120 of receiving a request message MR transmitted by a remote third-party entity 3 to a communication module 12 of a computer device 1.

The request message MR may be a non-formatted message generated by a user comprising e.g. the following text: Hello [ ] We would like to have 10 computing nodes of the B510 SandyBridge type with 64 GB random access memory [ ] we think that we need to use them for about 15 days over the period from June 1 to July 15. Alternatively, the message may also consist in a structured message that can be generated by a user or operator via a graphical reservation interface comprising e.g. the following text: <duration> 15</duration>; <periodB> 06/01/2018</periodB>; <periodE> 07/15/2018</periodE>; <ClassA_type> B510</ClassA_type>; <ClassA num> 10</ClassA num>

Therefore, these examples of request-message content illustrate the presence of keywords in the request message: B510, SandyBridge, GB, random access memory, days, control duration: 15 and control values: 10.

Upon reception 120 of such a request message MR, an identifying step 130 is implemented to identify one or more pieces of data contained in the request message MR, such as the identification 131 of a control duration D and the identification 132 of one or more keywords $KW_n$ thus defining a resource requirement for a determined duration. A value associated with each of the keywords $KW_n$ thus identified is sought during the identifying step 132, each value associated with each of the keywords respectively constituting control values associated with the request message MR previously received.

The identifying step 130 is followed by a computing step 140 by the data-processing module of a computer device 1, in order to produce one or more instance values $VI_n$, each of said instance values describing a numerical value associated with a resource class C1, C2, C3, C4 referenced in the resource-class repository, thus indicating a number of instances N1, Ni for each necessary resource class C1, C2, C3, C4, for meeting the resource requirement previously identified in the request message MR. The instance values $VI_n$ thus computed are then stored in a memory module 11 of a computer device 1 during a storing step 141. Additionally, the method may comprise, during this step, the association of a control duration D with each of the instance values, as shown in Table 1 below.

TABLE 1

| Class ID | VI | D |
| --- | --- | --- |
| C1 | 10 | 15 |

Each of the instance values $VI_n$ is then compared, during a comparing step 150, from the reservation repository, with the available instance values. If the reservation-management module 13 identifies (OK) one or more available instances for each resource class C1, C2, C3, C4 that meets the resource requirement, said available instance values for a resource class C1, C2, C3, C4 are delivered together with the required instance values $VI_n$ during a step 170 through a graphical representation G1. If no instance N1, Ni per resource class C1, C2, C3, C4 is identified (NOK) as being available for meeting the resource requirement during the comparing step 150, said required instance values $VI_n$ are delivered together with said unavailable instance values for a resource class C1, C2, C3, C4 during a step 170 through a graphical representation G1.

In the event that no instance N1, Ni per resource class C1, C2, C3, C4 is identified (NOK) as being available for meeting the resource requirement during the comparing step 150, the method 100 comprises a step of identifying 160 alternative instances $VI_n$.

This step 160 in particular consists in selecting 161 one or more instances N1, Ni of an alternative resource class C1, C2, C3, C4, i.e. different from that previously identified 130 and computed 140 and one or more durations that are at least equivalent to the control duration D previously identified, and in comparing 162 said alternative instance value(s) $VI_n$ with the resource classes of the available instances in the reservation repository. The step of identifying 160 alternative instances may e.g. comprise matrix calculations based on the control values and the control durations in relation to the values in the resource-class repository. Therefore, it is possible to determine combinations of resource classes that make it possible to meet the requirement. Preferably, the definitions of possible matrices are compared with the potential control period in order to delete the definitions resulting in an alternative control duration greater than the duration of the control period. In other words, this is in order to delete the definitions resulting in an availability period that is not entirely included in the control period. The definitions of possible matrices are therefore compared with the reservation repository and the reservation-management module eliminates the incompatible definitions. During this step, the alternative instance values are compared with the available instance values for the resource classes in question. If a sufficient number of instances are available, the definition is stored. Otherwise, another definition is pre-selected randomly from the remaining definitions and the reservation-management module repeats the process.

If no alternative instance is identified (NOK), an alert 163 is transmitted to the operator to inform them of the lack of availability of the requested resources.

In the event that the step of comparing 162 the alternative instance values $VI_n$ makes it possible (OK) to identify one or more alternative available resource classes C1, C2, C3, C4, for one or more durations at least equivalent to the previously identified control duration D, which meet the previously identified resource requirement, said alternative instance values $VI_n$ are delivered together with the alternative resource classes C1, C2, C3, C4 during a step 170 through a graphical representation G1.

Figure 6:
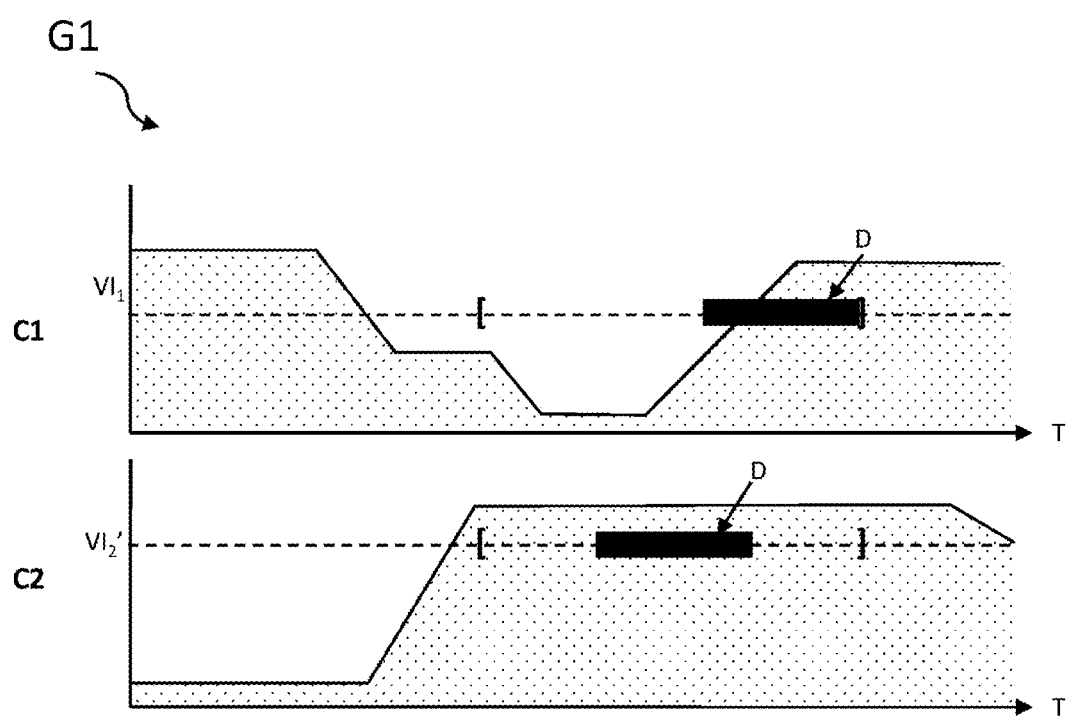
FIG. 6 shows a diagram of an example of a graphical representation of one or more required instance values per resource class as a function of time. The square brackets represent a control period.

An example graphical representation G1 produced from step 170 is described in connection with FIG. 6. In the example shown, a request message has been processed and has resulted in the identification of a required instance value $VI_1$ corresponding to the number of instances belonging to the resource class C1 that are necessary to meet the resource requirement. Nonetheless, as shown in FIG. 6, there are not enough instances available to meet the requirement. FIG. 6 also shows a required instance value $VI_2$ corresponding to the number of instances belonging to the resource class C2 that are necessary to meet the resource requirement. It can thus be observed that instances are available to meet the resource requirement in connection with the resource classes C2 for a control duration D. By contrast, no instance appears to be available to meet the resource requirement in connection with the resource class C1 for a control duration D. Indeed, the resource availability for each resource class C1, C2 is indicated by the area covered by dotted lines. This allows an operator to immediately see which are the unavailable resource classes C1, C2. This is assuming that the resource classes C1, C2 represent two computing type resource classes of which the instances have different hardware features. The operator thus has complementary information indicating that one or more instances of the resource class C2 are available for a required control duration D. The operator immediately visualizes that the alternative resource class C2 for an alternative instance value $VI_2$ is proposed to them instead of the unavailable resource class 1 to meet the resource requirement. The representation rapidly shows the operator that the instances in class C2 could meet the resource requirement of the request message.

The operator can thus choose which allocated resources to meet the resource requirement following the visualization of the available resources. The method thus comprises a step of generating 180 a pre-reservation message MPC containing an identifier for each instance N1, Ni identified as meeting the resource requirement and previously allocated by the operator, said pre-reservation message then being transmitted to the computer device 1. In a particular embodiment, the operator can, based on the resource requirement and in particular following the display of a graphical representation G1, register in a dedicated field of the pre-reservation message MPC if the reservation is certain, which corresponds to a RES availability index registered in a field of the reservation repository, or if the reservation is not certain, which corresponds to a PRERES availability index registered in a field of the reservation repository.

Following the step of generating 180 a pre-reservation message MPC, the method 100 comprises a step of editing 190 the reservation repository following the reception 191 of said pre-reservation message MPC computer device 1. The step 190 thus consists in registering, in the corresponding field of the reservation repository, an availability index for the instances N1, Ni identified in the pre-reservation message. Such editing is followed by a step of comparing 192 the availability index for the instances N1, Ni thus edited in the reservation repository. If, for a control duration D, one or more instances N1, Ni have (NOK) an availability index reflecting a reservation or pre-reservation in the corresponding field, i.e. these instances have already been allocated by the operator, the comparing step 192 is followed by generating and transmitting 193 an alert message to the operator indicating to them that an error in allocating resource instances C1, C2, C3, C4 has been made. By contrast, if the comparing step 192 indicates that the instance(s) N1, Ni do not have (OK) an availability index reflecting a reservation or pre-reservation in the corresponding field, i.e. that these instances have not been allocated by the operator and are therefore available, the comparing step 192 is followed by generating and transmitting 194 a confirmation message indicating that the instances N1, Ni have been allocated.

The invention claimed is:

1. A method for aiding decision-making for allocation of computing means on a high performance computing infrastructure allowing identification of a set of instances that meet a resource requirement, said method being implemented by a computer device comprising a communication module, a data-processing module, a reservation-management module and a memory module configured to store a resource-class repository, a reservation repository and a keyword repository, said method comprising:
  receiving, by means of the communication module, a request message containing data relating to a resource requirement for a given duration;
  identifying, by means of the data-processing module, in the request message:
    a control duration, wherein said given duration comprises said control duration,
    one or more keywords referenced in the keyword repository, and
    one or more control values, each of said one or more control values corresponding to a numerical value associated with a keyword of said one or more keywords referenced in the keyword repository that is identified;
  computing, from the one or more control values, by means of the data-processing module, one or more required instance values, each required instance value of the one or more required instance values corresponding to a numerical value associated with a class of resources referenced in the resource-class repository, said numerical value corresponding to an amount of computing means required to meet the resource requirement;
  comparing, from the reservation repository, by means of the reservation-management module, the one or more required instance values that are computed with available instance values over a duration that is at least equal to the control duration, to identify said set of instances per resource class from a plurality of resource classes that meets the resource requirement, and an availability period;
  generating a graphical representation of the one or more required instance values, which are each associated with a resource class, as a function of time,
  displaying said graphical representation on an information-displaying device, said graphical representation comprising
    instances of said set of instances that are available to meet the resource requirement for each resource class of said plurality of resource classes for said control duration, and
    instances of said set of instances that are unavailable, wherein resource availability for each resource class of said plurality of resource classes is indicated via a specific area of said graphical representation;
  such that said graphical representation allows an operator to
    immediately view which resource classes are unavailable and which resource classes are available,
    immediately visualize an alternative resource class for an alternative instance value from alternative instances that would meet the resource requirement of the request message, wherein the alternative resource class is different from a previously identified and computed resource class,
    choose which allocated resources from said resource classes that are available to meet the resource requirement; and,
  transmitting a confirmation message indicating that the instances have been allocated, wherein the confirmation message comprises an availability index associated with each instance of the set of instances, said availability index assuming a value selected from at least three values.

2. The method according to claim 1, wherein each instance of said set of instances is associated with a unique identifier, and further comprising generating a pre-reservation message including the unique identifier of all instances of the set of instances identified as meeting the resource requirement.

3. The method according to claim 1, wherein the request message contains data relating to a time period relating to the resource requirement and the identifying comprises identification, in the request message, of a control time period corresponding to the time period for which the resource requirement is requested.

4. The method according to claim 1, wherein the reservation-management module is configured to generate an alert when the reservation repository comprises two different availability-index values for a same instance in a same period.

5. The method according to claim 1, further comprising when the comparing does not make it possible to identify said set of instances that meets the resource requirement, identifying said alternative instances that includes selecting one or more combinations of classes of alternative resources and reservation durations that allow a service to be provided that is equivalent to the resource requirement, then comparing the alternative resources and required alternative instance values thereof with resource classes of available instances of the reservation repository.

6. A computer device for aiding decision-making for allocation of computing means on a high performance computing infrastructure allowing identification of a set of instances that meet a resource requirement, said computer device comprising:
  a memory module configured to store a resource-class repository,
  a reservation repository and a keyword repository,
  a communication module,
  a data-processing module, and
  a reservation-management module,
  wherein
    the communication module is configured to receive a request message containing data relating to a resource requirement for a given duration;
    the data-processing module is configured to identify, in the request message:
      a control duration, wherein said given duration comprises said control duration,
      one or more keywords referenced in the keyword repository, and
      one or more control values, each control value of said one or more control values corresponding to a numerical value associated with a keyword of said one or more keywords referenced in the keyword repository that is identified;

the data-processing module is further configured to compute, from the one or more control values, one or more required instance values, each required instance value of the one or more required instance values corresponding to a numerical value associated with a resource class referenced in the resource-class repository, said numerical value corresponding to an amount of computing means required to meet the resource requirement; and the reservation-management module is configured to compare, from the reservation repository, the one or more required instance values that are computed with available instance values over a duration that is at least equal to the control duration, to identify said set of instances per resource class from a plurality of resource classes that meets the resource requirement, and an availability period;

wherein the computer device is configured to generate a graphical representation of the one or more required instance values, which are each associated with a resource class, as a function of time, display said graphical representation on an information-displaying device, said graphical representation comprising instances of said set of instances that are available to meet the resource requirement for each resource class of said plurality of resource classes for said control duration, and instances of said set of instances that are unavailable, wherein resource availability for each resource class of said plurality of resource classes is indicated via a specific area of said graphical representation;

such that said graphical representation allows an operator to immediately view which resource classes are unavailable and which resource classes are available, immediately visualize an alternative resource class for an alternative instance value from alternative instances that would meet the resource requirement of the request message, wherein the alternative resource class is different from a previously identified and computed resource class, choose which allocated resources from said resource classes that are available to meet the resource requirement; and transmit a confirmation message indicating that the instances have been allocated, wherein the confirmation message comprises an availability index associated with each instance of the set of instances, said availability index assuming a value selected from at least three values.

7. The computer device of claim 6, wherein said computer device is a high performance computing system comprising said high performance computing infrastructure.

8. A non-transitory computer-readable medium having instructions stored thereon that, when executed by a computer, causes the computer to implement a method for aiding decision-making for allocation of computing means on a high performance computing infrastructure allowing identification of a set of instances that meet a resource requirement, said method being implemented by a computer device comprising a communication module, a data-processing module, a reservation-management module and a memory module configured to store a resource-class repository, a reservation repository and a keyword repository, said method comprising:

receiving, by means of the communication module, a request message containing data relating to a resource requirement for a given duration;

identifying, by means of the data-processing module, in the request message:

a control duration, wherein said given duration comprises said control duration, one or more keywords referenced in the keyword repository, and one or more control values, each of said one or more control values corresponding to a numerical value associated with a keyword of said one or more keywords referenced in the keyword repository that is identified;

computing, from the one or more control values, by means of the data-processing module, one or more required instance values, each required instance value of the one or more required instance values corresponding to a numerical value associated with a class of resources referenced in the resource-class repository, said numerical value corresponding to an amount of computing means required to meet the resource requirement;

comparing, from the reservation repository, by means of the reservation-management module, the one or more required instance values that are computed with available instance values over a duration that is at least equal to the control duration, to identify said set of instances per resource class from a plurality of resource classes that meets the resource requirement, and an availability period;

generating a graphical representation of the one or more required instance values, which are each associated with a resource class, as a function of time, displaying said graphical representation on an information-displaying device, said graphical representation comprising instances of said set of instances that are available to meet the resource requirement for each resource class of said plurality of resource classes for said control duration, and instances of said set of instances that are unavailable, wherein resource availability for each resource class of said plurality of resource classes is indicated via a specific area of said graphical representation;

such that said graphical representation allows an operator to immediately view which resource classes are unavailable and which resource classes are available, immediately visualize an alternative resource class for an alternative instance value from alternative instances that would meet the resource requirement of the request message, wherein the alternative resource class is different from a previously identified and computed resource class, choose which allocated resources from said resource classes that are available to meet the resource requirement; and transmitting a confirmation message indicating that the instances have been allocated, wherein the confirmation message comprises an availability index associated with each instance of the set of instances, said availability index assuming a value selected from at least three values.

\* \* \* \* \*